3,781,247
PYROLYTIC POLYMERIZATION CATALYST
Eugene A. Burns, Palos Verdes Peninsula, and Robert
J. Jones, Hermosa Beach, Calif., assignors to TRW
Inc., Redondo Beach, Calif.
No Drawing. Filed Feb. 1, 1972, Ser. No. 222,692
Int. Cl. C08f 27/00
U.S. Cl. 260—78.4 D                                6 Claims

ABSTRACT OF THE DISCLOSURE

Polymerization times and temperatures for alicyclic endo capped prepolymers are reduced by the inclusion of a Lewis acid-type catalyst. Effective amounts ranging preferably 1% to 3% by weight of a Lewis acid selected from any of the alkyl derivatives of or the halide salts of tin, aluminum, zirconium, zinc, vanadium, antimony, germanium, or titanium may be added to the prepolymer.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

U.S. Pat. 3,528,950 discloses the polymerization of alicyclic endo capped prepolymers. Polymerization of the prepolymers disclosed in the patent require a cure time of between 30 and 60 minutes at higher temperatures to obtain satisfactory properties for example at 260° to 300° C. An addition of approximately 1% of the polymerization catalyst will produce polymer properties in 10 minutes which are equivalent to polymer properties obtained in a 60 minute cure cycle in the absence of a catalyst.

SUMMARY OF THE INVENTION

Inclusion of a Lewis acid-type catalyst into a prepolymer end capped with an alicyclic endo compound produced by a Diels-Alder synthesis and characterized by the formula

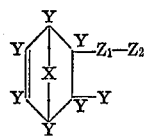

or

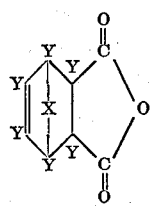

wherein Y can be hydrogen, halogen, nitro, aryl, alkyl, alkyl ether, or alkaryl; X can be carbonyl, oxygen, sulfur, methylene, halogen substituted methylene, alkyl substituted methylene, aryl substituted methylene; $Z_1$ is an alkylene group having 0 to 4 carbon atoms; and $Z_2$ is an acid radical, acid halide radical, amine radical or an ester radical, significantly reduces the cure time for the pyrolytic polymerization reaction. In other words, the co-reaction of the alicyclic endo end cap groups on the prepolymer by heating at elevated temperatures to cause chain extension and crosslinking of the prepolymer segment can be substantially improved by the inclusion of a Lewis acid-type catalyst in the prepolymer. The end capped prepolymer can be synthesized by reacting an organic acid with an organic hydroxide, an organic amine, an organic epoxide, or an organic imine and an alicyclic endo mono acid or acid anhydride at temperatures ranging from −18° C. to about 200° C. Addition of up to about 3% by weight of a Lewis acid-type catalyst effects polymerization of the prepolymer in one-half to one-sixth of the time required in the absence of the catalyst. Catalysts may be selected from any of the halide salts of or the alkyl derivatives of tin, aluminum, zirconium, zinc, vanadium, antimony, germanium, or titanium.

DISCLOSURE OF THE INVENTION

Alicyclic endo end capped prepolymers such as those disclosed in U.S. Pats. 3,528,950 and 3,565,549, are pyrolytically polymerized by heating in a temperature range of 260° C. to 300° C. for a period of between 30 to 60 minutes. The polymerization of the prepolymer, while the mechanism is not known precisely, is believed to occur across alicyclic endo end caps to form a three dimensional thermoset polymer. Thus, any prepolymer molecule which is end capped with an alicyclic endo end cap can be pyrolytically polymerized and is included within the scope and operability of this invention.

Generally, any Lewis acid selected from any tin, aluminum, zirconium, zinc, vanadium, antimony, germanium, or titanium alkyl derivative having up to 20 carbon atoms, or the halide salt of the same group of metals, is suitable for use as a catalyst for the polymerization reaction. The compound selected should be reasonably stable at temperatures up to about 200° C. to avoid premature reaction or volatilization.

It has been discovered that inclusion of a catalyst in an alicyclic endo end capped prepolymer will significantly reduce the polymerization time or temperature. Up to 3% by weight of the catalyst produces significant results in changing the conditions required for the polymerization reaction. Amounts in excess of 3% generally cause problems during initial molding because of catalyst volatilization. The preferred amount is about 1% by weight. Products having nearly equivalent long term thermo-oxidative stability to flowing air at 600° F. can be molded at a 1% catalyst level in 10 to 20 minutes compared to those molded without a catalyst requiring a 60 minute cure. This constitutes a significant reduction of cure time by 66% to 85%.

The following table sets forth the results of isothermal aging of catalyzed and uncatalyzed resin plugs at 315° C. under an air flow of 100 ml./minute. The resin employed was made from 4,4′-methylenedianiline reacted with pyromellitic dianhydride and end capped with nadic anhydride, i.e., 3,6-endomethylene - 1,2,3,6-tetrahydrophthalic anhydride nad the catalyst was stannic chloride.

TABLE

| Sample number | Amount catalyst (percent wt.) | Cure time (min.) | Molded Barcol hardness | Resin weight retention (percent) at experimental duration points (hours) as function of aging at 315° C. | | | |
|---|---|---|---|---|---|---|---|
| | | | | 118 | 257 | 330 | 500 |
| 1 | 0.0 | 30 | 52 | 92 | 86 | 83 | 74 |
| 2 | 0.0 | 60 | 51 | 98 | 97 | 96 | 95 |
| 3 | 1.0 | 10 | 52 | 97 | 95 | 94 | 92 |
| 4 | 1.0 | 20 | 52 | 97 | 95 | 94 | 92 |
| 5 | 1.0 | 30 | 54 | 96 | 95 | 94 | 92 |
| 6 | 1.0 | 45 | 52 | 96 | 94 | 93 | 89 |
| 7 | 1.0 | 60 | 52 | 96 | 94 | 92 | 88 |
| 8 | 2.5 | 30 | 52 | 95 | 90 | 88 | 79 |
| 9 | 2.5 | 60 | 54 | 95 | 93 | 91 | 87 |

All specimens were molded at 315° C. and 200 p.s.i. for the time durations listed in the table.

It can be seen from the table that resin plugs polymerized with 1% of the catalyst and cured for 10 to 30 minutes withstand aging approximately equivalent to the uncatalyzed resin cured for 60 minutes. Volatilization of the stannic chloride in samples 8 and 9 resulted in less desired specimen, however, sample 8 surpassed the performance of uncatalyzed sample 1. The problems created by volatilization at the higher concentration of the catalyst may be avoided by selected higher boiling or solid compounds such as zirconium tetrachloride, aluminum bromide, titanium tetrachloride, stannic bromide, germanium tetrabromide, vanadium trifluoride, zinc bromide, zinc chloride, antimony triiodide, or tin dilaurate.

The catalyst can be added either to the liquid starting constituents during the formulation of the prepolymer or to the powdered prepolymer. If the catalyst is added to the initial constituents, the catalyst is homogeneously dispersed throughout the prepolymer more readily. However, higher boiling catalysts must be used to avoid volatilization under some of the more severe process conditions which may be required during the prepolymer formation. In addition, there is a possibility that, because of the lower temperature and shorter time requirements imparted by the use of the catalyst, the conditions required for the prepolymer formation may prematurely activate the pyrolytic polymerization. If the catalyst is added to the prepolymer powder, the problems of volatilization during processing of the prepolymer or premature reaction are avoided. However, the blending of the catalyst powder into the prepolymer powder does not afford as intimate a dispersion of the catalyst as that obtained in the liquid state.

The following example will further illustrate the present invention.

EXAMPLE

Approximately 52.0 grams of methylenedianiline is dissolved in 100 ml. of dimethylformamide and 37.0 grams of nadic anhydride (3,6-endomethylene-1,2,3,6-tetrahydrophthalic anhydride) slurried in 29 ml. of dimethylformamide while maintaining the temperature at 25° C. This addition is followed by addition of 32.6 grams of pyromellitic dianhydride slurried in 63 ml. of dimethylformamide. The resulting mixture was allowed to stir at 25° C. for 2 hours to give a 40% by weight solution of amide-acid prepolymer. The dimethylformamide varnish solution was stripped of solvent by evaporation on a rotary evaporator under vacuum at 150° C. for ½ hour. The resulting moist prepolymer was completely imidized by heating for 2 hours in a vacuum oven at 140° C. to give 115 grams of dry molding powder. Approximately 1.2 grams of stannic chloride is blended into the resin powder, and the mixture is loaded into a molding die. The mold is closed and approximately 500 p.s.i. pressure is applied for 10 minutes at a temperature of 315° C. The molded product had a Barcol hardness of 52.

We claim:

1. A process for promoting the addition reaction of a prepolymer end capped with a compound selected from the group consisting of

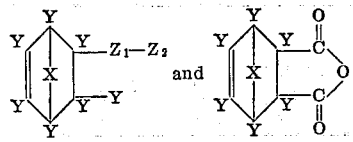

wherein X is a difunctional radical selected from the group consisting of carbonyl, oxygen, sulfur, methylene, halogen substituted methylene, alkyl substituted methylene, and aryl substituted methylene; Y is a monofunctional radical selected from the group consisting of halogen, hydrogen, nitro, aryl, alkyl, alkyl ether, and alkaryl; $Z_1$ is a difunctional radical selected from the group consisting of alkylenes having 0 to 4 carbon atoms; and $Z_2$ is a monofunctional radical selected from the group consisting of carboxylic acid, carboxylic acid halide, amino, and ester comprising:

(A) mixing a Lewis acid with said prepolymer, said Lewis acid selected from the group consisting of halide salts of tin, aluminum, zirconium, zinc, vanadium, antimony, germanium, and titanium or alkyl derivatives of tin, aluminum, zirconium, zinc, vanadium, antimony, germanium, and titanium, wherein said alkyl contains 1 to 20 carbon atoms; and (B) curing said prepolymer at temperatures ranging from 260° C. to 315° C. to form a high molecular weight polymer.

2. A process according to claim 1 wherein said Lewis acid is stannic tetrachloride.

3. A process according to claim 1 wherein said Lewis acid is present in amounts up to approximately 3% by weight of the resin prepolymer.

4. A composition comprising:

(A) a prepolymer end capped with a compound selected from the group consisting of

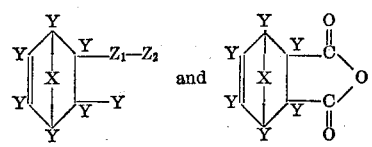

wherein X is difunctional radical selected from the group consisting of carbonyl, oxygen, sulfur, methylene, alkyl substituted methylene, and aryl substituted methylene; Y is a monofunctional radical selected from the group consisting of halogen, hydrogen, nitro, aryl, alkyl, alkyl ether, and alkaryl; $Z_1$ is a difunctional radical selected from the group consisting of alkylenes having 0 to 4 carbon atoms; and $Z_2$ is a monofunctional radical selected from the group consisting of carboxylic acid, carboxylic acid halide, amino, and ester; and (B) a Lewis acid selected from the group consisting of halide salts of tin, aluminum, zirconium, zinc, vanadium, antimony, germanium or alkyl derivatives of tin, aluminum, zirconium, zinc, vanadium, antimony, germanium, and titanium, wherein said alkyl contains 1 to 20 carbon atoms.

5. A composition according to claim 4 wherein said Lewis acid is stannic tetrachloride.

6. A composition according to claim 4 wherein said Lewis acid is present in amounts up to approximately 3% by weight of the resin prepolymer.

References Cited

UNITED STATES PATENTS

| | | | |
|---|---|---|---|
| 3,528,950 | 9/1970 | Lubowitz | 260—78.4 |
| 3,565,549 | 2/1971 | Lubowitz et al. | 117—126 |
| 3,179,632 | 4/1965 | Hendrix | 260—78 |

JOSEPH L. SCHOFER, Primary Examiner

J. KIGHT III, Assistant Examiner

U.S. Cl. X.R.

252—429 R; 260—78 R, TF, UA